United States Patent [19]
Fasulo et al.

[11] Patent Number: 5,198,495
[45] Date of Patent: Mar. 30, 1993

[54] BLENDS BASED ON VINYL-AROMATIC POLYMERS ENDOWED WITH HIGH MECHANICAL CHARACTERISTICS

[75] Inventors: Gian C. Fasulo; Dario Ghidoni; Andrea Callaioli; Andrea Licon, all of Mantova, Italy

[73] Assignee: Montedipe S.r.l., Milan, Italy

[21] Appl. No.: 591,687

[22] Filed: Oct. 2, 1990

[30] Foreign Application Priority Data

Oct. 3, 1989 [IT] Italy ................... 41008 A/89

[51] Int. Cl.$^5$ ............ C08L 51/04; C08L 53/00; C08L 53/02; C08L 23/00
[52] U.S. Cl. .................................. 525/71; 525/88; 525/89; 525/95; 525/240
[58] Field of Search ............ 525/89, 88, 98, 71, 525/95, 240

[56] References Cited

U.S. PATENT DOCUMENTS

| | | | |
|---|---|---|---|
| 4,379,884 | 4/1983 | Bailey | 525/96 |
| 4,397,988 | 8/1983 | Shorman | 525/95 |
| 4,499,238 | 2/1985 | Iwata et al. | 525/901 |
| 4,939,207 | 7/1990 | Fasulo et al. | 525/89 |

Primary Examiner—James J. Seidleck
Assistant Examiner—W. R. H. Clark
Attorney, Agent, or Firm—Bryan Cave

[57] ABSTRACT

Blends based on vinyl-aromatic polymers endowed with high mechanical characteristics, even after successive processings at temperatures equal to or higher than 200° C. and unvaried rheological properties, comprising:

10 to 90% by weight of a vinyl-aromatic polymer containing from 0.5 to 5% by weight of a vinyl-aromatic monomer conjugated diene linear block copolymer and from 5 to 15% by weight of a diene rubber;

5–50% by weight of a polyolefin; and

5–40% by weight of a vinyl-aromatic monomer-conjugated diene star block radial copolymer, having a diene content comprised between 5 and 35% by weight; the sum of the three components being equal to 100%.

14 Claims, No Drawings

BLENDS BASED ON VINYL-AROMATIC POLYMERS ENDOWED WITH HIGH MECHANICAL CHARACTERISTICS

FIELD OF THE INVENTION

The present invention relates to blends based on vinyl-aromatic polymers showing high mechanical characteristics, even after successive processings carried out at temperatures equal to or higher than 200° C., such as for example between 200° C. and 250° C., and unvaried rheological properties.

More particularly, the present invention relates to blends based on vinyl-aromatic polymers having high mechanical and rheological properties suitable for producing shaped bodies endowed with good physical properties and wherein it is possible to recover the processing scraps.

DESCRIPTION OF THE PRIOR ART

As is known, vinyl-aromatic polymers are thermoplastic resins suitable for being transformed, under heating, into shaped bodies by injection or extrusion molding. Such vinyl-aromatic polymers have a fair tenacity, but they are not suitable for use in applications where a high tenacity associated with good chemical resistance is required.

A way of improving those lacking properties is to provide a blend with other polymers having the missing properties so as to give a material having the desired combination of properties.

However, this approach has been successful only in a limited number of cases; in fact, generally, the blending results in combining the worst characteristics of each component, the overall result being a material of such poor properties as not to be of any practical or commercial value.

The reasons for this failure are the fact that not all polymers are compatible with each other and, therefore, do not perfectly adhere. As a result, interfaces are formed among the components of the blend which represent weakness and breaking points.

More particularly, the blending based on polystyrene, or generally on a vinyl-aromatic polymer or copolymer, either as such or made impact resistant by grafting with a rubber, and a polyolefin, gives rise to blends endowed with heterogeneous structure and mechanical weakness, due to the incompatibility between these two types of polymers.

From published European Patent Application No. 291,352, it is known that homogeneous polymeric compositions containing a polyolefin and a vinyl-aromatic polymer may be prepared by using a vinyl-aromatic polymer containing small quantities of a vinyl aromatic monomer-conjugated diene linear block polymer, as elastomeric component, and a vinyl-aromatic monomer-conjugated-conjugated diene star-block polymer, as a compatibilizing agent between the polyolefin and the vinyl-aromatic polymer.

Particularly, the above reported European Patent Application No. 291,352 describes a polymeric blend comprising:

from 40 to 98% by weight of a vinyl-aromatic polymer containing, as a dispersed phase, as an elastomeric component, from 0.5 to 5% by weight of a vinyl aromatic monomer-conjugated diene linear block copolymer;

from 1 to 54% by weight of a polyolefin; and from 1 to 20% by weight of a vinyl aromatic monomer conjugated diene star-block copolymer; the sum of the three components being equal to 100%.

The above reported blends are homogeneous and suitable for being transformed into shaped bodies by extrusion, injection molding and/or thermoforming; however, they show some drawbacks which limit the use thereof in such processes. The main drawback is that the processing scraps cannot be reused owing to a drastic lowering of the mechanical properties of the blend, particularly the resilience and the melt fluidity. This undesired effect involves a waste or a not-noble use of the processing scraps the amount of which may be even 50-60% of the virgin product.

SUMMARY OF THE INVENTION

The Applicant has now found that the above reported drawbacks may be overcome by appropriately regulating the amount of dienic rubber in the vinyl-aromatic monomer-conjugated diene star block polymer, used as a compatibilizing agent.

Thus, the subject matter of the present invention is a thermoplastic polymeric composition comprising:

(a) from 10 to 90% by weight of a vinyl aromatic polymer (A) containing, as an elastomer component, from 0.5 to 5% by weight of a vinyl aromatic monomer-conjugated diene linear block copolymer and from 5 to 15% of a diene rubber;

(b) from 5 to 50% by weight of a polyolefin (B); and (c) from 5 to 40% by weight of a vinyl aromatic monomer-conjugated diene radial, star shaped, block copolymer (C), having a diene amount comprised between 5 and 35% by weight; the sum of the three components being equal to 100%.

Preferably, the polymeric composition of the present invention contain:

from 60 to 80% by weight of a vinyl aromatic polymer (A);

from 10 to 30% by weight of a polyolefin (B); and from 5 to 20% by weight of a vinyl aromatic monomer-conjugated diene radial, block, star shaped polymer (C);

the sum of components (A), (B), and (C) being equal to 100%.

The vinyl aromatic polymer (A) may be prepared by carrying out the polymerization of a vinyl aromatic monomer having the general formula:

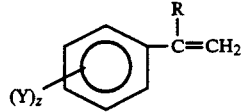

wherein R represents hydrogen or an alkyl radical having from 1 to 4 carbon atoms; Z is zero or an integer from 1 to 5, and Y represents a halogen atom or an alkyl radical having from 1 to 4 carbon atoms, in the presence of a dienic rubber and of a vinyl-aromatic monomer-conjugated diene linear block polymer, in the above reported amount, optionally by using conventional radicalic catalysts.

Examples of vinyl-aromatic compounds having the above general formula are: styrene; methyl-styrene; mono-, di-, tri-, tetra- and penta-chlorostyrene and the corresponding alpha-methyl-styrenes; styrenes alkylated in the nucleus and the corresponding alpha-methylstyrenes such as ortho- and para-methyl-styrenes, ortho- and para-ethyl-styrenes; ortho- and para-methyl-alpha-methyl-styrenes, etc. These monomers may be used either alone or in admixture with each other or with other copolymerizable co-monomers such as, for instance, maleic anhydride, acrylonitrile, methacrylonitrile, $C_1$–$C_4$ alkyl esters of acrylic or methacrylic acid.

The used dienic rubber is preferably comprised from 7 to 12% by weight and may be polybutadiene, high or medium cis- and low viscosity polybutadiene, poly-isoprene, copolymers of butadiene and/or isoprene with styrene or with other monomers.

The vinyl aromatic monomer-conjugated diene linear block copolymer is preferably comprised between 2 and 5% by weight. It is per se well known in the art and available on the market.

These linear block copolymers contain from 20 to 60% by weight of recurring units of a vinyl aromatic monomer and, correspondingly, from 80 to 40% by weight of recurring units of a conjugated diene, and they are of the type:

B/S and

S-(B/S)

wherein S are polymeric blocks based on the vinyl aromatic monomer and B/S are blocks of copolymers of the "random" and/or "tapered" type of the vinyl aromatic monomer and of the conjugated diene.

These linear block copolymers may be prepared according to the method disclosed in U.S. Pat. No. 3,149,182.

It is preferred to polymerize first the mono vinyl aromatic monomer by anionic polymerization in an inert solvent and in the presence of a lithium-containing organo-metallic catalyst (initiator), and then to add the conjugated diene so as to form a polymeric chain of conjugated dienes in the already formed polymeric chain of vinyl aromatic monomers.

The preparation of the block copolymers is carried out in an inert hydrocarbon solvent such as isobutane, pentane, hexane, cyclohexane, benzene, toluene, xylene, and the like.

The polymerization is carried out in the absence of air, moisture or other impurities, which as is well-known, adversely affect the anionic catalytic system. The polymerization temperature may be kept between 0° and 120° C., and preferably between 40° and 80° C.

As initiator the generally used lithium alkyl, cycloalkyl or aryl compounds may be used, such as for instance methyl-lithium, n.-butyl-lithium, sec.-butyl-lithium, cyclohexyl-lithium, phenyl-lithium, p.-tolyl-lithium and naphthyl-lithium, in a quantity generally between 0.2 and 20 millimoles per mole of monomer.

The polymerization is ended by adding a chain stopper such as alcohol, water or oxygen.

The molecular weight of the block polymer may vary within a wide range, although a molecular weight lower than 100,000 is preferred.

The properties, structure and characteristic of these block copolymers are reported by Holden in "Block and Graft Copolymerization", Chapter 6, pages 133–191, the contents of which are to be regarded as an integral part of the present application.

Linear block polymers of this type are available on the market for example as "Stereon 840" sold by The Firestone Co. Akron (Ohio), or as the S-B/S block copolymer sold by Shell Chemical Company under the trade name "Kraton 2103", "Kraton 2104", "Kraton 2113", etc.

The preparation of the vinyl-aromatic polymer (A) may be carried out according to any known suspension, bulk-suspension or continuous bulk polymerization process.

A preferred method of preparation consists in carrying out a pre-polymerization of the vinyl-aromatic monomer in the presence of a conventional free radical catalyst, of a dienic rubber and of the above block polymer in a first reactor up to the attainment of a conversion lower than 50% by weight of the fed monomers. n Then, the polymerization is completed in one or more subsequent reactors up to the complete polymerization of the monomer.

The thus-obtained polymer is then devolatilized and granulated.

The polyolefine (B) is preferably polyolefin comprising the linear low density (LLDPE) the medium density and the high density polyethylene.

Other polyolefins such as polypropylene, polybutene, polymethylpentene, as well as the copolymers of two or more alpha-olefins such as, for example, ethylene-propylene copolymers, the copolymers of an alpha-olefin with an ethylenically unsaturated monomer different from the alpha-olefin, such as for example ethylenevinyl acetate (EVA) copolymers, also may be used.

The vinyl aromatic monomer-conjugated diene radial block, star shaped, copolymer (C), used as a compatibilizing agent in the composition of the present invention, is also of a known type and available on the market. This star block copolymer is of the type:

 (II)

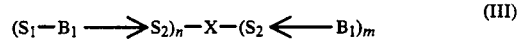 (III)

 (IV)

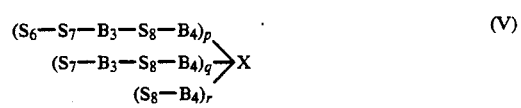 (V)

wherein: S, $S_1$, $S_2$, $S_3$, $S_4$, $S_5$, $S_6$, $S_7$ and $S_8$ are non-elastomeric polymer blocks of a vinyl-aromatic monomer having the above formula (I), of which the polymer blocks S in polymer (II) have a unimodal or polymodal, preferably bimodal, molecular weight distribution, whilst each of the polymer blocks from $S_1$ to $S_8$ in polymers (III) and (IV) and (V) each has a unimodal molecular weight distribution; B, $B_1$, $B_2$, $B_3$ and $B_4$ are elastomeric polymer blocks based on a conjugated diene; X is a radical of a polyfunctional coupling agent by means of which the copolymer blocks forming the branches are chemically coupled to one another; K is an integer not less than 3, generally comprised between 3 and 10 and preferably 3 or 4; m and n are integers, m being greater than n, the sum of m and n being greater than 3, generally comprised between 3 and 10 and preferably 3 or 4; and p, q and r are integers the sum of which is greater than 3.

The symbol → in formulae (III) and (IV) means that the transition between the polymer blocks is gradual rather than sharp.

These radial block, star-shaped polymers (C) are already known in the literature. Thus, the polymers of formula (II) are disclosed in German application (DOS)1,959,922; while U.S. Pat. Nos. 4,086,298 and 4,167,545 disclose the polymers of formulae (III) and (IV) and European Patent No. 153,727 the polymers of formula (V).

The radial block, star-shaped polymer (C) may be used alone or in mixture with polystyrene, as described in English Patent No. 1,570,404.

The monovinyl-aromatic monomer particularly suitable for the preparation of the block copolymers (C) is styrene; alkyl-substituted styrenes showing the same copolymerization properties, such as for instance methyl-styrenes, ethyl-styrenes, t.-butyl-styrenes, etc., may also be used.

Conjugated dienes useful for preparing the block copolymers (C) are those having from 4 to 8 carbon atoms in the molecule, such as for instance 1,3-butadiene, isoprene, 2,3-dimethyl-1,3-butadiene, piperylene, and mixtures thereof.

In these star-shaped polymers (C), the non-elastomeric polymer block is preferably polystyrene having a molecular weight comprised between 5,000 and 250,000. The elastomeric polymer block is preferably polybutadiene having a molecular weight comprised between 5,000 and 50,000 or a copolymer thereof containing less than 30% and preferably less than 20% by weight of a vinyl-aromatic monomer, such as styrene, the monomer distribution being substantially random.

The transition between the segments $B_1 \rightarrow S_2$ in formula (III) and $B_2 \rightarrow S_5$ in formula (IV) is gradual in the sense that the proportion of the vinyl-aromatic monomer in the dienic polymer increases progressively in the direction of the non-elastomeric polymer block, while the proportion of the conjugated diene accordingly decreases progressively.

The molecular weight of the blocks $B_1 \rightarrow S_2$ and $B_2 \rightarrow S_5$ are preferably comprised between 10,000 and 100,000.

These radial block polymers (C) are generally prepared by forming first the linear block polymer having active lithium atoms at one end of the chain by using the above method.

These linear and active polymeric chains are then coupled by the addition of a polyfunctional coupling agent having at least three reactive sites able to react with the lithium-carbon bond, so as to couple the carbon atom chain on the functional group.

The coupling agents suitable for coupling on the living lithium-terminated polymers are known and disclosed, for example, by English Patent No. 985,614.

Typical examples of polyfunctional agents coupling are the polyepoxides, such as for instance the epoxidized polybutadiene, the epoxidized soyabean oil, the epoxidized linseed oil, polyesters such as diethyl-adipate, polyaldelides such as silicon tetrachloride; polyisocyanates such as 1,2,4-benzene-triisocyanate; polyimines; polyaldehydes; polyketones such as 1,3,6-hexane-trione; polyanhydrides such as pyromellitic dianhydride; halides of polyacids, such as the chloride of mellitic acid, etc.; poly-vinyl aromatic compounds, such as divinyl-benzene may be also used as coupling agents, as described in U.S. Pat. No. 3,280,084. The divinyl-benzene polymerizes to form in situ polyfunctional coupling agents.

The coupling must be followed by a termination, generally with methanol, water and carbon dioxide, acids and so on.

The radial, star-shaped, block polymers (C) are available on the market for example with the trade-name "STYROLUX" produced and sold by BASF or with the tradename "K-RESIN" produced and sold by PHILLIPS PETROLEUM.

The blend of the present invention may be prepared by carrying out first a blending of the components at a low temperature, in any known type of mixer. Then, the blend is extruded in single-screw or twin-screw or twin-screw extruders at a temperature preferably between 150° and 250° C.

The compositions may contain a small amount, generally from 0.1 to 3% by weight, of a stabilizing agent or of other additives, intimately mixed therein.

Plasticizers, lubricants, anti-flame agents, blowing agents, anti-static agents, dyestuffs, pigments, foaming agents, to provide lighter articles and lighter semi-finished products, may be added during the mixing step of the components, in quantities from 0.1 to 10% by weight.

The blends of the present invention may be easily processed and show a set of properties which, on the whole, are significantly better than those of the separate components. For this reason, the blends of the present invention find useful application for obtaining materials endowed with high mechanical and rheological properties combined with high chemical resistance.

Therefore, said blends are useful in the field of electric appliances, electronics, and generally in the field of technical materials, in the form of a film, sheet, tape, band, rod, box, cup, container, etc.

The blends may be used to provide foamed articles by techniques per se known in the art.

A further advantage of the blends of the present invention is that they maintain substantially unvaried all the mechanical and rheological properties even after repeated processings at temperatures equal to or higher than 200° C. For these properties, the processing scraps may be recovered and may be restored in the processing cycle and retreated as the virgin material.

Furthermore, the blends of the present invention have improved properties of fluidity, rigidity and thermoresistance with respect to the blends disclosed by the published European Patent Application No. 291,352.

The following illustrative but not limiting examples are given in order to still better comprehend the present invention and to put it into practice.

In the examples all parts are expressed by weight, unless otherwise indicated.

EXAMPLE 1

Comparison

Into a rotating drum blender there were blended, at room temperature:

75 parts by weight of an impact-resistant styrene polymer (A) containing dispersed in the polymeric matrix, 7.75% by weight of a polybutadiene rubber, and 3% of an S/B linear block polymer containing 25% of styrene and 75% of butadiene, having a molecular weight of 75,000;

15 parts by weight of a linear low density polyethylene (LLDPE) (B) having a density of 0.926 $g/cm^3$ and an M.F.I. of 0.7 g/10 min.; and 10 parts by weight of a radial block copolymer having the structure (II), comprising 70% by weight of butadiene and 30% by weight of styrene, containing silicon as coupling radical, each polymeric unit having a molecular weight of 40,000.

The thus-obtained blends were extruded from a mono-screw BANDERA TR 45 extruder having a diameter of 45 mm.

The thermal profile of the extruder between the hopper and the extrusion head was 150° C., 180° C., 190° C., 215° C.

The granule of the first extrusion was then re-extruded in the same mono-screw BANDERA TR 45 extruder at the temperature of 240° C. and with a residence time in the extruder of 55 seconds.

The resilience and rheological properties of the obtained samples were determined after two, four and six extrusion processes carried out in the same extruder and in the same processing conditions.

For the rheological properties, the Melt flow index (M.F.I.) was determined according to ASTM D 1238, at 220° C. and 10 Kg; and the resilience IZOD with notch was determined at 23° C., according to ASTM D 256, on test pieces having 12.7 mm thickness, obtained by injection molding at a temperature of 190° C. on a NEGRI & BOSSI V 17-110 FA. 0

The measured properties are listed in the following Table 1.

EXAMPLE 2

By operating in the same process conditions of example 1, a blend was prepared constituted by:

75 parts by weight of the impact-resistant styrene polymer (A) of example 1;

15 parts by weight of the linear low density polyethylene (LLDPE) (B) of example 1; and 10 part by weight of a radial block polymer (C) having the structure (II), comprising 35% by weight of butadiene and 65% by weight of styrene, containing silicon as coupling radical, each polymeric unit having a molecular weight of 40,000.

The rheological and IZOD resilience properties are listed in the following Table 1.

TABLE 1

| NUMBER OF EXTRUSIONS | COMPARATIVE EXAMPLE N.1 | | EXAMPLE N.2 | |
|---|---|---|---|---|
| | IZOD (J/m) | M.F.I. (g/10') | IZOD (J/m) | M.F.I. (g/10') |
| 1 | 280 | 30 | 300 | 40 |
| 2 | 220 | 18 | 260 | 38 |
| 4 | 140 | 25 | 230 | 36 |
| 6 | 105 | 30 | 210 | 38 |

EXAMPLE 3

By operating in the same process conditions of example 1, a blend was prepared constituted by:

75 parts by weight of a impact-resistant styrene polymer (A) of example 1;

15 parts by weight of linear low density polyethylene (LLDPE) (B) of example 1, and 10 parts by weight of a radial block polymer having the structure (IV) (C) comprising 20-21% by weight of butadiene and correspondingly 79-80% of styrene and containing silicon as coupling radical.

In order to determine the properties, the granules, obtained by extrusion in BANDERA TR 45 extruder, were injection-molded at a temperature of 190° C. on a NEGRI-BOSSI-17-110 FA injection-molding press in order to obtain test pieces having sizes according to standard specifications.

The properties measured on the thus-obtained test pieces are reported in the following Table II.

To measure the characteristics of the blends of the present invention, the following methods were used:

a) Thermal properties: Softening temperature Vicat at 5 Kg was determined according to ISO 306.

b) Rheological properties: Melt flow index (M.F.I.) was determined according to ASTM D.1238, at 220° C. and 10 Kg.

c) Mechanical properties: Tensile strength and elastic modulus were measured according to ASTM-D 638; IZOD resilience (with notch) at 23° C., was measured according to ASTM-D 256, on test pieces having a 12.7 mm thickness.

TABLE II

| THERMAL PROPERTIES: VICAT at 5 Kg | °C. | 88 |
|---|---|---|
| RHEOLOGICAL PROPERTIES: M.F.I. | g/10' | 42 |
| MECHANICAL PROPERTIES: | | |
| yield point | N/mm$^2$ | 23 |
| Ultimate tensile strength | N/mm$^2$ | 21 |
| Elongation at break | % | 65 |
| Elastic modulus | N/mm$^2$ | 1600 |
| IZOD | J/m | 280 |

The first extruded granules were there re-extruded in the same mono-screw BANDERA TR 45 extruder at the temperature of 240° C. with a permanence time in the extruder of 55 seconds.

The resilience and rheological properties of the obtained samples were determined after two, four and six extrusions through the same extruder in the same processing conditions.

The obtained properties are:

| NUMBER OF EXTRUSIONS | 1 | 2 | 4 | 6 |
|---|---|---|---|---|
| IZOD (J/m) | 280 | 250 | 230 | 210 |
| M.F.I. (g/10') | 42 | 41 | 40 | 41 |

EXAMPLE 4

Example 3 was repeated by varying the amounts of polymer (A) from 75 to 80 parts by weight and of the polyethylene (B) from 15 to 10 parts by weight.

The resilience and rheological properties of the obtained samples after one, two, four and six extrusions through BANDERA TR 45 extruder, in the same process conditions of example 3, are:

| NUMBER OF EXTRUSIONS | 1 | 2 | 4 | 6 |
|---|---|---|---|---|
| M.F.I. (g/10') | 40 | 40 | 39 | 39 |
| IZOD (J/m) | 230 | 210 | 191 | 180 |

What is claimed is:

1. A blend based on aromatic vinyl polymers endowed with high mechanical properties even after successive processings at temperatures equal to or higher than 200° C. and unvaried rheological properties, comprising:

from 10 to 90% by weight of a vinyl aromatic polymer (A) containing, as an elastomer component, from 0.5 to 5% by weight of a vinyl aromatic monomer-conjugated linear block copolymer and from 5 to 15% of a dienic rubber;

from 5 to 50% by weight of a polyolefin (B); and from 5 to 40% by weight of a vinyl aromatic monomer-conjugated diene radial block star-shaped polymer (C) characterized by having a diene amount comprised of between 5 and 35% by weight; the sum of the above three components being equal to 100%.

2. A blend based on vinyl aromatic polymers according to claim 1, comprising:

from 60 to 80% by weight of the vinyl aromatic polymer (A);

from 10 to 30% by weight of a polyolefin (B); and from 5 to 20% by weight of a vinyl aromatic monomer-conjugated diene radial block star-shaped polymer;

the sum of the above three components being equal to 100%.

3. A blend based on vinyl aromatic polymers according to claim 1, wherein the amount of the dienic rubber in the vinyl aromatic polymer (A) is between about 7 and 12% by weight.

4. A blend based on vinyl aromatic polymers according to claim 1, wherein the amount of the vinyl-aromatic monomer-conjugated diene linear block polymer, in the vinyl aromatic polymer (A), is between about 2 and 5% by weight.

5. A blend based on aromatic vinyl polymers according to claim 1, wherein the vinyl aromatic monomer-conjugated diene linear block polymer contains from 20 to 60% by weight of recurring units of a vinyl aromatic monomer and, correspondingly, from 80 to 40% by weight of recurring units of a conjugated diene.

6. A blend based on vinyl aromatic polymers according to claim 1, wherein the linear block copolymer is of the type

B/S and

S-(B/S)

wherein S are polymeric blocks based on vinyl aromatic monomer, B/S are blocks of copolymers of the "Random" and/or "Tapered" type of the vinyl aromatic monomer and of the conjugated diene.

7. A blend based on vinyl aromatic polymers according to claim 1, wherein the polyolefin is polyethylene of the linear low density, high density, or medium density type.

8. A blend based on vinyl aromatic polymers according to claim 1, wherein the polyolefin is polypropylene, a copolymer of two or more alpha-olefins, or a copolymer of an alpha-olefin with an ethylenically unsaturated monomer different from the alpha-olefins.

9. A blend based on vinyl aromatic polymers according to claim 1, wherein the vinyl aromatic monomer-conjugated diene radial block, star-shaped polymer (C) is one having the following structure:

$$(S-B)_k-X \quad (II)$$

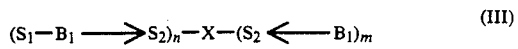

wherein S, $S_1$, $S_2$, $S_3$, $S_4$, $S_5$, $S_6$, $S_7$, and $S_8$ are non-elastomeric polymer blocks of vinyl-aromatic monomer having the formula:

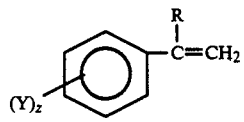

wherein R represents hydrogen or an alkyl radical having from 1 to 4 carbon atoms; z is zero or an integer from 1 to 5, and Y represents a halogen atom or an alkyl radical having from 1 to 4 carbon atoms; of which the polymer blocks S in polymer (II) have a unimodal or polymodal molecular weight distribution, whilst the polymeric blocks from $S_1$ to $S_8$ in polymers (III) and (IV) and (V) each has a unimodal molecular weight distribution; B, $B_1$, $B_2$, $B_3$, and $B_4$ are elastomeric polymer blocks based on a conjugated diene; X is a radical of polyfunctional coupling agent by means of which the copolymer blocks forming the branches are chemically coupled to one another; K is an integer not less than 3; m and n are integers, m being greater than n, the sum of m and n being greater than 3; and p, q and r are integers the sum of which is greater than 3 and the symbol →in formulae (III) and (IV) means that the transition between the polymer blocks is gradual.

10. A blend based on vinyl aromatic polymers according to claim 9, wherein the non-elastomeric polymer block is polystyrene having a molecular weight comprised between 5,000 and 250,000 and the elastomeric polymer block is polybutadiene having a molecular weight comprised between 5,000 and 50,000 or a copolymer thereof containing less than 30% and preferably less than 20% by weight of a vinyl aromatic monomer, such as styrene, the distribution of the monomers being substantially random.

11. A blend based on vinyl aromatic polymers according to claim 1, wherein the block, radial, star-shaped polymer (C) is used in mixture with polystyrene.

12. A blend based on vinyl aromatic polymers according to claim 9, wherein the polymer blocks S in polymer (II) have a bimodal molecular weight distribution.

13. A blend based on vinyl aromatic polymers according to claim 9, wherein the integer K is between 3 and 10.

14. A blend based on vinyl aromatic polymers according to claim 9, wherein the sum of the integers m and n is between 3 and 10. 9

* * * * *